Figure 1:
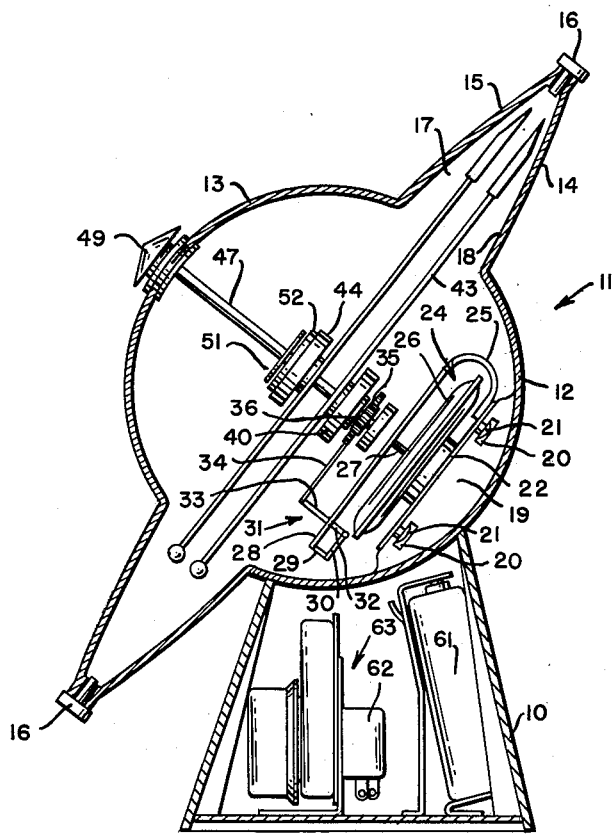

Feb. 19, 1963   J. A. GAIT   3,077,778
INSTRUMENT

Filed Sept. 17, 1959   2 Sheets-Sheet 1

INVENTOR.
JOHN A. GAIT
BY
Pollard Johnston Smythe Robertson
ATTORNEYS

Feb. 19, 1963     J. A. GAIT     3,077,778
INSTRUMENT

Filed Sept. 17, 1959                                      2 Sheets-Sheet 2

INVENTOR.
JOHN A GAIT
BY
Pollard Johnston Smythe & Robertson
ATTORNEYS

United States Patent Office 3,077,778
Patented Feb. 19, 1963

3,077,778
INSTRUMENT
John A. Gait, Riverside, Ill., assignor of one-half to Pam Clock Co., Inc., New Rochelle, N.Y., a corporation of New York
Filed Sept. 17, 1959, Ser. No. 840,564
10 Claims. (Cl. 73—386)

The present invention relates to indicating instruments and particularly to a new and improved indicating instrument of the type employing a reference hand that is moved into coincidence with an indicating hand at predetermined time intervals.

In many indicating instruments such as barometers and the like, it is often desired to know the relative change of a condition within a predetermined time interval. Invariably such instruments employ reference hands that are manually set into coincidence with an indicating hand. Unless the time of coincidence setting is recorded, the relative change has little meaning since it would be unrelated to time.

While the principles of the present invention are applicable to any type of indicating instrument which employs an adjustable reference hand in combination with an indicating hand, they will be shown and described as applied to a barometer.

The principal object of this invention is to provide an indicating instrument having a reference hand that is automatically moved into coincidence with an indicating hand at predetermined time intervals.

Another object of this invention is to provide such an indicating instrument which is combined with a time controlled magnetic field producing device to effect automatic movement of the reference hand into coincidence with an indicating hand.

Another object of the invention is to produce such an indicating instrument in which an electro-magnetic field producing device is provided for causing the reference hand to move into coincidence with an indicating hand.

In one aspect of the invention, the indicating instrument may include a condition measuring mechanism such as a barometer movement adapted to move an indicating hand through an arc of a circle less than 360 degrees in response to variations in barometric pressure. A reference hand may be mounted along the axis of rotation of the indicating hand and may be provided with sufficient restraining means to normally maintain it in any position to which it is moved in the absence of any extraneous force tending to move it. The pressure indicating hand may be fixed to a spindle that is mounted in substantially frictionless bearings, and a driving connection may be provided between the spindle and a pressure responsive device such, for example, as a bellows-type barometer movement, although any other type of pressure responsive device may be employed.

In another aspect of the invention, another spindle may be mounted in spaced coaxial relation with the indicating hand spindle and it may support a reference hand. A friction providing means may be provided for this other spindle so that it will normally remain at a location to which it has been moved in the absence of an extraneous force tending to change its location. Between the ends of the coaxial spindles may be located an idle spindle coaxial with the other two, and it may be supported by, but insulated from, the reference hand and indicating hand spindles for a purpose to be described later.

In still another aspect of the invention, an electro-magnetic field producing device may be provided for periodically causing the corresponding ends of each hand to assume opposite polarity relatively to each other. This device may take the form of coils of wire in series relation spiralling around both the indicating and reference hands throughout a substantial portion of their length and wound in a manner such that the corresponding ends of the hands assume an opposite polarity when a current passes through the coils of wire. In order periodically to pass a current through the coils, a normally open switch may be connected in series with a power source and the coils of wire, and a presettable timer motor may be employed to close the switch for a short interval periodically.

Variations in barometric pressure will move the indicating hand out of coincidence with the reference hand and periodically, upon closing of the normally open switch by the timer motor, current flows through the wire coils causing corresponding ends of the two hands to assume opposite polarity. Since the indicating hand cannot move because it is drivingly connected to the pressure responsive device, the friction holding the reference hand is overcome, causing it to turn about its axis until it is in coincidence with the indicating hand. Upon opening of the normally open switch as the timer motor continues to function, the reference hand is frictionally retained in place while further variations in atmospheric pressure cause the indicating hand to move out of coincidence with the reference hand, thereby measuring the relative change in barometric pressure from the time of periodic energization of the coils.

The above, other objects and novel features of the invention will become apparent from the following specification and accompanying drawings which are merely exemplary.

Figure 2:
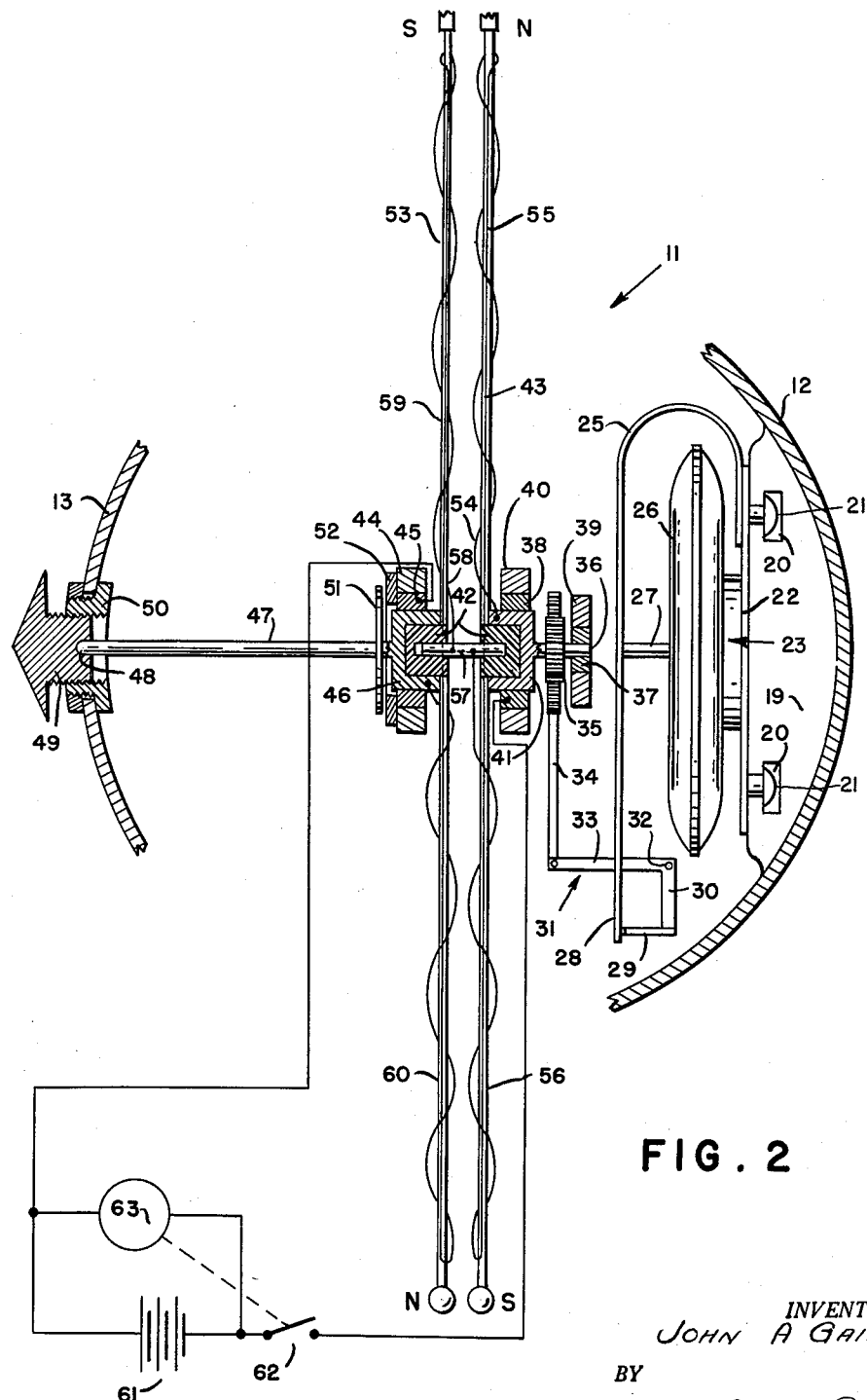

In the drawings:

FIG. 1 is a sectional elevational view of a barometer to which the principles of the invention have been applied; and FIG. 2 is an enlarged sectional view of certain parts shown in FIG. 1.

Referring to the drawings, the principles of the invention are shown as applied to a barometer including a hollow base 10 of generally frustro-conical form on which may be mounted a substantially spherical hollow housing 11. The housing 11 may be made in two substantially hemispherical mating parts 12 and 13, each having dished flanges 14 and 15 that contact each other at their outer peripheries along a parting line 16—16. The construction is such that the dished flanges form a hollow annular space 17 surrounding the spherical housing 11 and communicating with the hollow interior thereof.

The flange 15 may be transparent, while the flange 14 may be translucent with a dial 18 imprinted on it. The spherical portions 12 and 13 as well as the base 10 may also be translucent so as not to expose to view the barometer and indicating mechanisms.

The portion 12 may be provided interiorly thereof with a supporting pad 19 having parallel T-slots 20 formed therein for the reception of headed connectors 21 attached to a base 22 of a bellows-type pressure responsive device 23. The pressure responsive device may include an evacuated cylindrical bellows member 24 fixed to the base 22. A curved leaf spring 25 may extend from the base 22 over the free face 26 of the bellows member 24. A connecting link 27 may be provided between the spring 25 and the face 26 such that expansion and contraction of the bellows member 24 will impart an axial movement to the connecting link 27 and a corresponding movement to the free end 28 of the spring 25.

The free end 28 of the spring 25 may be fixed to a link 29 parallel with link 27 and to which the movement of link 27 is transmitted in amplified form. The link 29 may be pivoted to the end of one arm 30 of a bell crank lever 31 which latter is pivoted at a point 32 rigidly mounted within housing 11. The other link 33 of the bell crank 31 is connected to a rack 34 that is adapted to mesh with a pinion 35 fixed to a spindle 36.

Referring to FIG. 2, the spindle 36 may be journaled in substantially frictionless, aligned bushings 37 and 38 mounted in spaced standards 39 and 40 within the housing 11. The one end of spindle 36 may be enlarged at 41 and bored to form a cup for receiving an insulating liner 42 for a purpose to be described later. An indicating hand 43 may be fixed to the enlarged end of spindle 36.

From the foregoing it is evident that variations in barometric pressure will cause expansion and contraction of the bellows member 24, thereby reciprocating rack 34 through the linkage including link 27, spring 25 and bell crank 31. Reciprocation of rack 34 will oscillate pinion 35 and with it, spindle 36 and indicating hand 43 so that variations in atmospheric pressure will be indicated on dial 18.

A standard 44 within housing 11 supports a bushing 45 in line with bushing 38 of standard 40. The enlarged end 46 of a spindle 47 is journaled within bushing 45 and is arranged for slight axial movement therein. The opposite end of spindle 47 is provided with a hemispherical portion that seats in a mating surface 48 within a plug 49. The plug 49 is threaded into a grommet 50 extending through a hole in member 13 in alignment with the bushing 45. A disc 51 is fixed to spindle 47 and it is adapted to cooperate with a friction disc 52 on the standard 44. By turning the plug 49, any desired friction may be provided between discs 51 and 52 so that spindle 47 will remain in any rotative position to which it is moved in the absence of extraneous forces tending to change its rotative position. A reference hand 53 may be fixed to the enlarged end of the spindle 47.

An electrical conductor 54 may be electrically connected to the enlarged end 41 of spindle 36 and spiralled around the pointer portion 55 of the indicating hand 43, starting from a point near its center of rotation and spiralling radially outwardly, winding around the hand 43 in a direction such that when a current flows through the conductor, the coil formed thereby will have a north pole adjacent the pointer of the indicating hand.

The conductor may then be threaded along the hand 43 to a point near its opposite end where it is spiralled radially inwardly around the portion 56 of hand 43, winding around the hand in a direction such that when a current flows through the conductor, the coil around the portion 56 will have a south pole at the outer end of portion 56. The conductor 54 may then be electrically connected to a conducting pin 57 extending between spindles 36 and 47 and supported within the bored enlarged ends 41 and 46 thereof, but insulated therefrom by the insulating linings 42 therein.

Another conductor 58 may be electrically connected to the pin 57 and it may be spiralled about the portion 59 of the hand 53 radially outwardly, and winding about the portion 59 in a direction opposite to the direction conductor 54 winds about the portion 55 of the hand 43. The conductor 58 may then be threaded along the hand 53 to the outer end of the portion 60 thereof and then spiralled radially inwardly, winding about the portion 60 in a direction opposite to the direction conductor 54 winds about portion 56 of hand 43. Accordingly, as the current flows from conductor 54 through the conductor 58, a south pole is produced at the outer end of portion 59 of hand 53 and a north pole is produced at the outer end of portion 60 thereof. The inner end of conductor 58 may be electrically connected to the enlarged portion 46 of spindle 47.

A power supply 61, which in the embodiment disclosed comprises a battery, may have its negative terminal connected in series with a normally open switch 62 and the bushing 38 within which the enlarged end 41 of spindle 36 is journaled. The positive terminal of the power supply 61 may be connected to bushing 45 within which the enlarged end 46 of spindle 47 is journaled.

A timer motor 63 may be employed to close the switch 62 momentarily periodically, depending upon the setting of the motor 63. While the motor 63 may be any type of timer motor including spring wound, it is shown as an electrical timer motor connected across the terminals of the power supply 61.

With the apparatus in the condition shown, each time the timer motor 63 closes switch 62, current flows from the negative terminal of power source 61 to bushing 38, thence through enlarged end 41 of spindle 36 to conductor 54, thence through conductor 54 to pin 57, thence through conductor 58 to enlarged end 46 of spindle 47, to bushing 45, thence to the positive terminal of the power supply 61. This produces poles of opposite polarity at corresponding ends of the hands 43 and 53, thereby causing such ends to be magnetically attracted toward each other. Since the hand 43 cannot move due to its mechanical connection to the barometer movement, the friction provided by discs 51 and 52 is overcome, whereupon the hand 53 moves into coincidence with the hand 43.

Although the various features of the new and improved indicating instrument have been shown and described in detail to fully disclose one embodiment of the invention, it will be evident that numerous changes may be made in such details, and certain features may be used without others without departing from the principles of the invention.

What is claimed is:

1. In an indicating instrument, an indicator hand made of magnetic permeable material; means within said instrument for moving said indicating hand about an axis in response to a condition being indicated by said instrument; a reference hand made of magnetic permeable material mounted for turning movement about an axis coextensive with the axis of said indicator hand; means for restraining the turning of said reference hand; oppositely coiled electrical conductors on each of said hands, which when energized overcomes said restraining means and effects the movement of said reference hand into coincidence with said indicator hand; and means for periodically energizing said oppositely coiled electrical conductors.

2. In an indicating instrument, an indicator hand made of magnetic permeable material; means within said instrument for moving said indicating hand about an axis in response to a condition being indicated by said instrument; a reference hand made of magnetic permeable material mounted for turning movement about an axis coextensive with the axis of said indicator hand; means for restraining the turning of said reference hand; electromagnetic means on each of said hands, which when energized overcomes said restraining means and effects the movement of said reference hand into coincidence with said indicator hand; and means for periodically energizing said electro-magnetic means.

3. In an indicating instrument, an indicator hand made of magnetic permeable material; means within said instrument for moving said indicating hand about an axis in response to a condition being indicated by said instrument; a reference hand made of magnetic permeable material mounted for turning movement about an axis coextensive with the axis of said indicator hand; means for restraining the turning of said reference hand; electromagnetic means associated with said hands, which when energized produces poles of opposite polarity at the corresponding ends of said hands and a magnetic field of sufficient intensity to overcome said restraining means; and means for periodically energizing said electro-magnetic means.

4. In an indicating instrument, an indicator hand made of magnetic permeable material; means within said instrument for moving said indicating hand about an axis in response to a condition being indicated by said instrument; a reference hand made of magnetic permeable material mounted for turning movement about an axis coextensive with the axis of said indicator hand; means for restraining the turning of said reference hand; a coil of wire supported by, and through which said indicating hand extends; another coil of wire supported by, and through which said reference hand extends, said coils being wound in opposite directions; means for connecting said coils in series with a power source and a normally open switch; and means for periodically closing said switch to cause current to flow through said coils in a manner such that the ends of said coils at corresponding ends of said hands are at opposite polarity and a magnetic field of sufficient intensity to overcome said restraining means is produced between said hands.

5. In an indicating instrument, an indicator hand made of magnetic permeable material; means within said instrument for moving said indicating hand about an axis in response to a condition being indicated by said instrument; a reference hand made of magnetic permeable material mounted for turning movement about an axis coextensive with the axis of said indicator hand; means for restraining the turning of said reference hand; a conductor spirally wound around the pointer end of said indicating hand radially outwardly, said conductor extending to the opposite end of said indicator hand and being spirally wound radially inwardly in the same direction; a series electrical connection between said conductor and another conductor spirally, oppositely wound around said reference hand but in the same radial directions as the first conductor is spirally wound around said indicating hand; means for connecting said series connected coils in series with a power supply and a normally open switch, said power supply being adequate to produce a magnetic field between said hands sufficient to overcome said restraining means; and means for periodically closing said switch.

6. Apparatus comprising in combination, a substantially frustro-conical hollow base; a hollow, substantially spherical housing member supported by said base; a hollow annular enclosure surrounding said housing, the space within said housing and said enclosure being in communication; a dial within said enclosure; means within said housing for supporting a barometer movement; means for supporting an indicating hand spindle within said housing; a linkage between said barometer movement and said spindle to cause said spindle to turn in response to atmospheric pressure variations; an indicating needle made of magnetic permeable material on said spindle having a pointer extending into said enclosure for cooperation with said dial; a reference hand spindle supported within said housing in alignment with said indicating hand spindle; a reference hand made of magnetic permeable material on said reference hand spindle; means for restraining the turning of said reference hand spindle; oppositely coiled electrical conductors, which when energized overcomes said restraining means and effects the movement of said reference hand into coincidence with said indicating needle; and means for periodically energizing said oppositely coiled electrical conductors.

7. Apparatus comprising in combination, a substantially frustro-conical hollow base; a hollow, substantially spherical housing member supported by said base; a hollow annular enclosure surrounding said housing, the space within said housing and said enclosure being in communication; a dial within said enclosure; means within said housing for supporting a barometer movement; means for supporting an indicating hand spindle within said housing; a linkage between said barometer movement and said spindle to cause said spindle to turn in response to atmospheric pressure variations; an indicating needle made of magnetic permeable material on said spindle having a pointer extending into said enclosure for cooperation with said dial; a reference hand spindle supported within said housing in alignment with said indicating hand spindle; a reference hand made of magnetic permeable material on said reference hand spindle; means for restraining the turning of said reference hand spindle; electro-magnetic means, which when energized overcomes said restraining means and effects the movement of said reference hand into coincidence with said indicating needle; and means for periodically energizing said electro-magnetic means.

8. Apparatus comprising in combination, a substantially frustro-conical hollow base; a hollow, substantially spherical housing member supported by said base; a hollow annular enclosure surrounding said housing, the space within said housing and said enclosure being in communication; a dial within said enclosure; means within said housing for supporting a barometer movement; means for supporting an indicating hand spindle within said housing; a linkage between said barometer movement and said spindle to cause said spindle to turn in response to atmospheric pressure variations; an indicating needle made of magnetic permeable material on said spindle having a pointer extending into said enclosure for cooperation with said dial; a reference hand spindle supported within said housing in alignment with said indicating hand spindle; a reference hand made of magnetic permeable material on said reference hand spindle; means for restraining the turning of said reference hand spindle; electro-magnetic means associated with said hands, which when energized produces poles of opposite polarity at the corresponding ends of said hands and a magnetic field of sufficient intensity to overcome said restraining means; and means for periodically energizing said electro-magnetic means.

9. Apparatus comprising in combination, a substantially frustro-conical hollow base; a hollow, substantially spherical housing member supported by said base; a hollow annular enclosure surrounding said housing, the space within said housing and said enclosure being in communication; a dial within said enclosure; means within said housing for supporting a barometer movement; means for supporting an indicating hand spindle within said housing; a linkage between said barometer movement and said spindle to cause said spindle to turn in response to atmospheric pressure variations; an indicating needle made of magnetic permeable material on said spindle having a pointer extending into said enclosure for cooperation with said dial; a reference hand spindle supported within said housing in alignment with said indicating hand spindle; a reference hand made of magnetic permeable material on said reference hand spindle; means for restraining the turning of said reference hand spindle; means on the outside of said housing for varying said restraining means; electro-magnetic means, which when energized overcomes said restraining means and effects the movement of said reference hand into coincidence with said indicating needle; and means for periodically energizing said electro-magnetic means.

10. An apparatus including a reference hand made of magnetic permeable material movable about an axis of rotation; a condition indicating hand made of magnetic permeable material; condition-responsive means connected to said indicating hand; means normally holding said reference hand in a set position, said reference hand being movable therefrom; normally de-energized electromagnetic field producing means for setting up an electromagnetic field between said hands to cause said reference hand to move into coincidence with said indicating hand; and means for periodically energizing said electro-magnetic field producing means.

References Cited in the file of this patent

UNITED STATES PATENTS

| | | |
|---|---|---|
| 1,632,736 | Jameson | June 14, 1927 |
| 2,145,069 | Beusch et al. | Jan. 24, 1939 |
| 2,598,899 | Fehr | June 3, 1952 |

FOREIGN PATENTS

| | | |
|---|---|---|
| 5,364 | Great Britain | 1914 |